US010546387B2

(12) United States Patent
Hirzer et al.

(10) Patent No.: US 10,546,387 B2
(45) Date of Patent: Jan. 28, 2020

(54) POSE DETERMINATION WITH SEMANTIC SEGMENTATION

(71) Applicant: QUALCOMM Incorporated, San Diego, CA (US)

(72) Inventors: Martin Hirzer, Pischelsdorf (AT); Peter Michael Roth, Mooskirchen (AT); Clemens Arth, Judendorf-Straßengel (AT); Vincent Lepetit, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 15/699,221

(22) Filed: Sep. 8, 2017

(65) Prior Publication Data

US 2019/0080467 A1    Mar. 14, 2019

(51) Int. Cl.
*G06T 7/73* (2017.01)
*G06T 7/11* (2017.01)

(52) U.S. Cl.
CPC .......... *G06T 7/73* (2017.01); *G06T 7/11* (2017.01); *G06T 7/74* (2017.01); *G06T 2207/20076* (2013.01); *G06T 2207/20081* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS

| 9,224,060 | B1 | 12/2015 | Ramaswamy |
| 10,089,330 | B2* | 10/2018 | Gao ................... G06F 17/2765 |
| 10,096,122 | B1* | 10/2018 | Agrawal ................ G06T 7/194 |
| 10,169,650 | B1* | 1/2019 | Ming ................... G06K 9/3233 |
| 2012/0041722 | A1* | 2/2012 | Quan ..................... G06T 17/05 |
| | | | 703/1 |
| 2014/0248950 | A1 | 9/2014 | Tosas |

(Continued)

FOREIGN PATENT DOCUMENTS

WO    2016075081 A1    5/2016

OTHER PUBLICATIONS

Martinović A., Mathias M., Weissenberg J., Van Gool L. A Three-Layered Approach to Facade Parsing. In: Fitzgibbon A., Lazebnik S., Perona P., Sato Y., Schmid C. (eds) Computer Vision—ECCV 2012. ECCV 2012. Lecture Notes in Computer Science, vol. 7578. Springer, Berlin, Heidelberg (Year: 2012).*

(Continued)

*Primary Examiner* — Soo Shin
(74) *Attorney, Agent, or Firm* — QUALCOMM Incorporated

(57) ABSTRACT

A method determines a pose of an image capture device. The method includes accessing an image of a scene captured by the image capture device. A semantic segmentation of the image is performed, to generate a segmented image. An initial pose of the image capture device is generated using a three-dimensional (3D) tracker. A plurality of 3D renderings of the scene are generated, each of the plurality of 3D renderings corresponding to one of a plurality of poses chosen based on the initial pose. A pose is selected from the plurality of poses, such that the 3D rendering corresponding to the selected pose aligns with the segmented image.

34 Claims, 12 Drawing Sheets

(56) References Cited

U.S. PATENT DOCUMENTS

| | | |
|---|---|---|
| 2015/0055821 A1 | 2/2015 | Fotland |
| 2015/0371440 A1* | 12/2015 | Pirchheim ............... G06T 17/05 345/419 |
| 2016/0085310 A1 | 3/2016 | Shotton et al. |
| 2017/0148222 A1* | 5/2017 | Holzer ................. H04N 13/243 |
| 2018/0232947 A1* | 8/2018 | Nehmadi ................ G06T 17/05 |

OTHER PUBLICATIONS

Premachandran et al., "PASCAL boundaries: A class-agnostic semantic boundary dataset," CoRR, abs/1511.07951, 2015. URL http://arxiv.org/abs/1511.07951 (Year: 2015).*

* cited by examiner

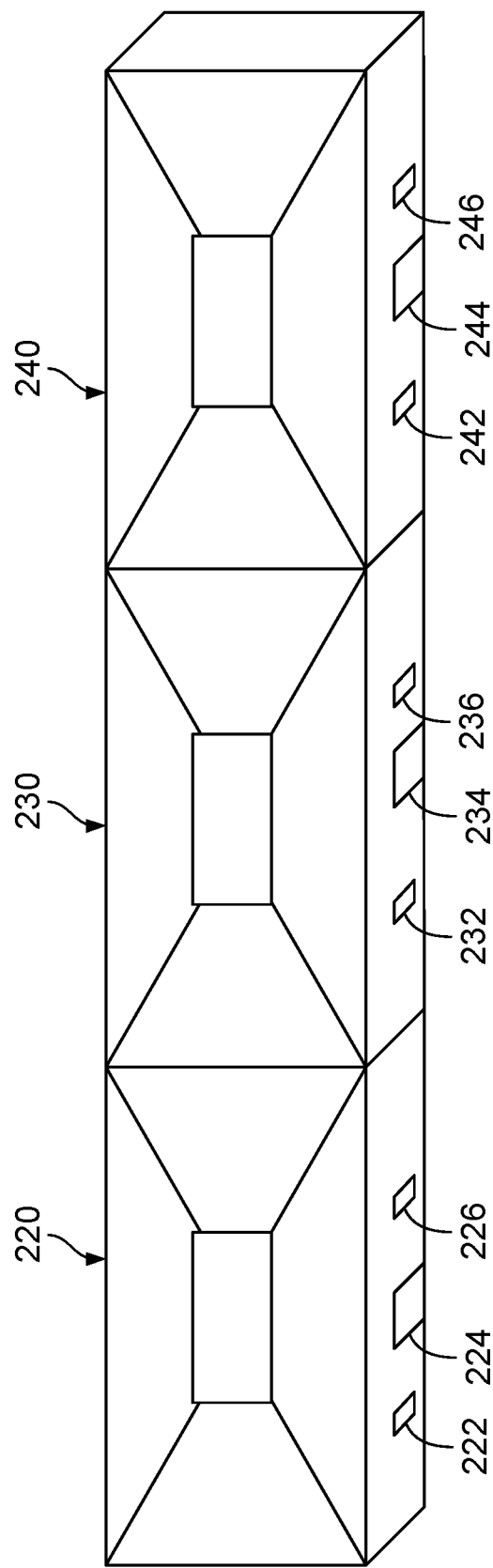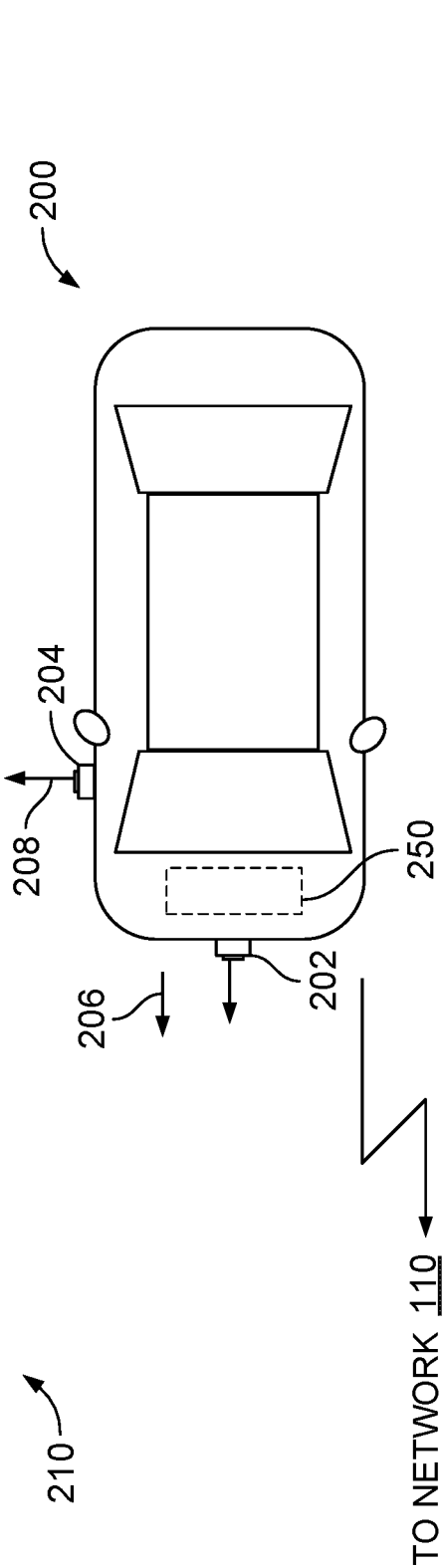
FIG. 2

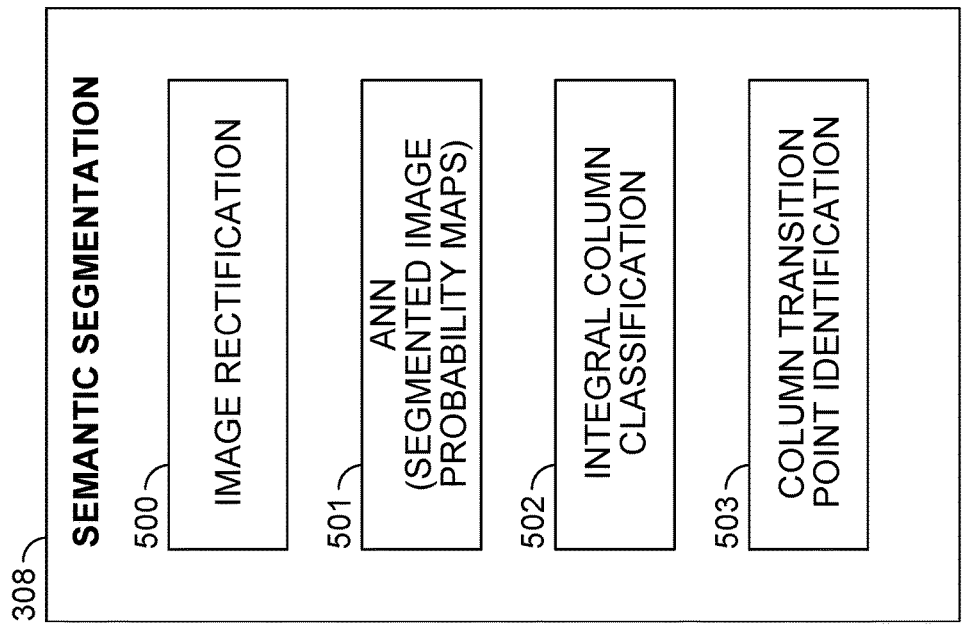
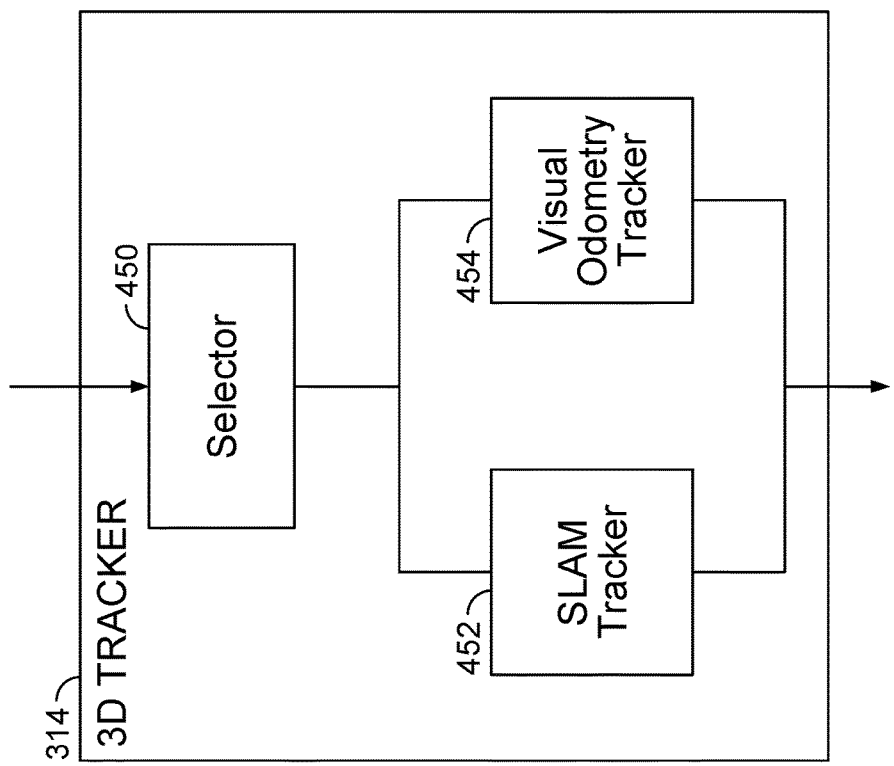

POSE DETERMINATION WITH SEMANTIC SEGMENTATION

CROSS-REFERENCE TO RELATED APPLICATIONS

None

STATEMENT REGARDING FEDERALLY SPONSORED RESEARCH OR DEVELOPMENT

None

BACKGROUND

Field

This description relates to computer vision generally, and more specifically to localization and pose determination.

Description of Related Art

Augmented reality (AR) systems, autonomous driving, or mobile robotics use accurate camera registration in a global reference frame, e.g., using GPS or compass sensor information. Image-based localization techniques have been developed in order to improve the computed camera pose estimate.

Approaches using pre-registered images can receive one or more input images from a camera and prior information from device sensors (e.g., global positioning system (GPS) data, gyro, or accelerometer). Using the input image(s) and prior information, the three-dimensional (3D) position or full six degrees of freedom (DoF) pose of an input image can be computed by matching two-dimensional (2D) image points to preregistered 3D scene points stored in a database obtained from previously-captured images. Pre-registered image collections may capture a single specific appearance of a recorded scene. A camera for which a pose is desired may capture an image of the scene under changing conditions due to illumination, season, or construction work, for example, making feature matching a challenge.

Another technique uses 2D cadastral maps of the metes-and-bounds of properties, annotated with per-building height information, referred to herein as "2.5D maps" or elevation models. 2.5D maps can be generated from Light Imaging, Detection, And Ranging (LIDAR) data, for example.

Simultaneous localization and mapping (SLAM) based systems may be used in outdoor localization tasks. Using untextured 2.5D models, it is possible to instantly initialize and globally register a local SLAM map without having the user perform any specific motions for initialization. The SLAM based method finds the corners of buildings in the input image by extracting vertical line segments.

SUMMARY

In one example a method of determining a pose of an image capture device is disclosed. The method includes accessing an image of a scene captured by the image capture device. A semantic segmentation of the image is performed, to generate a segmented image. An initial pose of the image capture device is generated using a three-dimensional (3D) tracker. A plurality of 3D renderings of the scene are generated, each of the plurality of 3D renderings corresponding to one of a plurality of poses chosen based on the initial pose. A pose is selected from the plurality of poses, such that the 3D rendering corresponding to the selected pose aligns with the segmented image.

In one example a system for determining a pose of an image capture device includes a processor coupled to access an image of a scene captured by the image capture device. A non-transitory, machine-readable storage medium is coupled to the processor and encoded with computer program code for execution by the processor. The computer program code includes code for performing a semantic segmentation of the image to generate a segmented image. Code is included for causing a three-dimensional (3D) tracker to generate an initial pose of the image capture device. Code is included for generating a plurality of 3D renderings of the scene, each of the plurality of 3D renderings corresponding to one of a plurality of poses chosen based on the initial pose. Code is included for selecting a pose from the plurality of poses, such that the 3D rendering corresponding to the selected pose aligns with the segmented image.

In one example a system for determining a pose of an image capture device includes means for performing a semantic segmentation of an image of a scene captured by the image capture device to generate a segmented image. Means are disclosed for generating an initial pose of the image capture device. Means are disclosed for generating a plurality of 3D renderings of the scene, each of the plurality of 3D renderings corresponding to one of a plurality of poses chosen based on the initial pose. Means are disclosed for selecting a pose from the plurality of poses, such that the selected pose aligns the 3D rendering with the segmented image.

In one example a non-transitory, machine-readable storage medium and encoded with computer program code for configuring a processor to determine a pose of an image capture device. The computer program code includes code for performing a semantic segmentation of the image to generate a segmented image. Code is included for causing a three-dimensional (3D) tracker to generate an initial pose of the image capture device. Code is included for generating a plurality of 3D renderings of the scene, each of the plurality of 3D renderings corresponding to one of a plurality of poses chosen based on the initial pose. Code is included for selecting a pose from the plurality of poses, such that the selected pose aligns the 3D rendering with the segmented image.

BRIEF DESCRIPTION OF DRAWINGS

FIG. 2 is a diagram of an exemplary application of the system of FIG. 1.

FIG. 4 is a block diagram of the 3D Tracker shown in FIG. 3A.

FIG. 5 is a block diagram of the semantic segmentation block shown in FIG. 3A.

DETAILED DESCRIPTION

Figure 1:
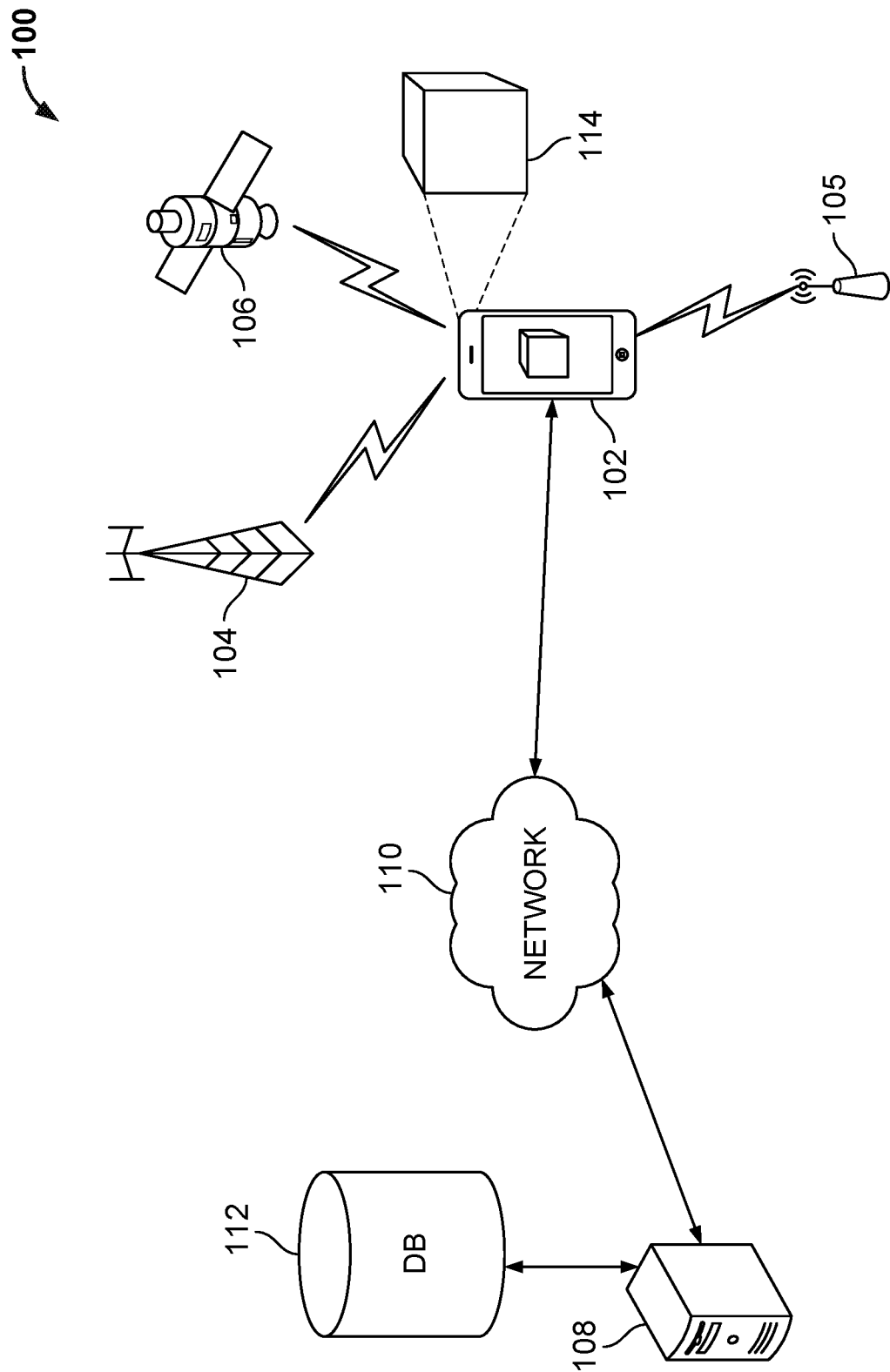
FIG. 1 is a schematic diagram of an embodiment of a system for pose determination.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

The term "image capture device" as used herein broadly encompasses a variety of systems having at least one device with optics and an imaging sensor having an array of photodetectors for capturing images. Image capture devices include, but are not limited, to a dedicated camera, a mobile device (e.g., a laptop computer, a tablet computer, a smart phone), an extended reality (e.g., augmented reality or virtual reality) system, a robotic system, an automotive vehicle-mounted camera system, or the like.

In determining the pose of an image capture device fixedly attached to a mechanical system (e.g., a robot or an automotive vehicle), the pose of the image capture device also determines the pose of the mechanical system (e.g., robot, automotive vehicle). In any of the examples described herein, determination of the pose of the image capture device can implicitly identify the pose of a mechanical system to which the image capture device is fixedly attached. Also, in any of the examples described below, determination of the pose of the image capture device can implicitly identify the pose of a mechanical system, where a six degree-of-freedom (6 DoF) transformation between a coordinate system of the image capture device and a coordinate system of the mechanical system is known. For brevity, the examples discuss the pose of the image capture device, but the results can be used by diverse applications, such as robotics and driverless vehicles.

Accurate geo-localization of images is used by applications such as outdoor augmented reality (AR), autonomous driving, mobile robotics, and navigation, extended reality (XR), virtual reality (VR), and augmented virtuality (AV). Since GPS and compass information may not have a desired precision for these applications (e.g., in urban environments), computer vision methods that register and track mobile devices within a global reference frame are advantageous.

Various 3D trackers (tracking models) are available for estimating the pose of a subject at any given time, given an initial condition (referred to herein as an initial pose). Different trackers exhibit different reliability for different applications. A tracker can be selected to provide greater reliability for any given application, but all trackers are subject to drift over an extended period of time.

An exemplary system described below can determine a pose of an image capture device at any given time using a 3D tracker, such as visual odometry tracking or simultaneous localization and mapping (SLAM). The 3D tracker estimates the current pose of the image capture device. Periodically, the image capture device captures an image, and the method can use semantic segmentation to localize the image capture device. The pose determination based on semantic segmentation of the captured image is considered to be ground truth, and is used to update the 3D tracker. The system can efficiently and reliably determine the pose in an urban environment or other environment having buildings.

The semantic segmentation information is used to periodically update a tracking model of the 3D tracker for accurately locating a subject, such as an image capture device of an augmented reality system, a robot, or an autonomous automotive vehicle. The update to the tracking model based on semantic segmentation of the captured image can correct drift, if any, in the tracker.

A scalable and efficient method is described below. The method can use 2.5D maps, such as maps of the outlines of buildings with their approximate heights. The 2.5D maps are broadly available, facilitating their use for localization. Images may contain texture information, but 2.5D maps are not textured. Thus, a texture-less representation of an image can be generated and matched against a 2.5D map. Also, the image capture device which captures the image can have a different pose from the pose used to create the 2.5D map, presenting an additional challenge for matching the image against the 2.5D map. Examples below generate 3D renderings from the 2.5D maps for several poses to facilitate matching.

The semantic segmentation information helps to correct the drift and prevent the 3D tracker from drifting further, without requiring additional reference images. It is desirable to avoid the need for additional reference images, which may be cumbersome to acquire and/or challenging to match or align under changing illumination conditions. The system and method are applicable in a variety of different application domains, including but not limited to augmented reality and robotics.

An exemplary system receives an image of an urban scene from the image capture device and rectifies the image. An accelerometer or gravity sensor is used to determine the angles between vertical edges in the input image and the local vertical direction. The angles are used to rectify the input image, so that the vertical edges of the image are aligned in the same direction as corresponding vertical lines in the 3D rendering. In some embodiments, vertical edges of the image and vertical edges of the 3D rendering are aligned parallel to a vertical axis of a global coordinate system. The accelerometer or gravity sensor provides a reliable measure of a "true vertical" reference direction, allowing reliable determination of the angles between vertical edges in the image and the true vertical direction.

The semantic segmentation classifies components in the rectified image into a predetermined number of classes. In some embodiments, the system has four classes, including: facades, vertical edges, horizontal edges, and background. The semantic segmentation can identify the edges of buildings reliably and take advantage of architectural edges, in addition to facades. The edges may be useful in classifying the urban scene when the field of view of the image capture device is narrow. The edges also facilitate identification of individual facades of two or more "row houses", which are connected houses having the same height and the same setback from the curb.

An artificial neural network (ANN), such as a convolutional neural network (CNN) or fully convolutional network (FCN) can be trained to perform semantic segmentation of a scene from a single input image. During the training, the CNN or FCN learns to ignore blocking (i.e., occluding) foreground objects (e.g., cars, pedestrians) which block a portion of a facade, vertical edge, horizontal edge, or background. During training, the blocking foreground objects are labeled as belonging to the same class as the component (i.e., facades, vertical edges, horizontal edges, and background) behind the blocking foreground object.

After training, the semantic segmentation can identify a building facade, even if a part of the facade is blocked from the field of view of the image capture device by trees, shrubs, pedestrians, or automotive vehicles. The semantic segmentation can also distinguish the vertical and horizontal edges at the boundaries of a building facade from smaller architectural features, such as windows, doors, and ledges. The ANN (e.g., CNN or FCN) does not need to be re-trained for each new scene or transitory foreground object, enhancing the practical applicability of this approach.

The pose of the image capture device 102 is then determined by: generating pose hypotheses based on (and including) the initial pose provided by the 3D tracker, evaluating the likelihood score for each hypothesis, and finally choosing the pose that maximizes the score as the pose of the image capture device 102. In some embodiments, the system generates a plurality of pose hypotheses around an initial pose generated by the 3D tracker. A respective 3D rendering is generated for each pose hypothesis, based on the 2.5D maps. The system can apply a cost function to efficiently evaluate each of the plurality of pose hypotheses and the initial pose, to finely sample the pose space around the initial pose from the 3D tracker and avoid local minima. The cost function can determine and select the 3D pose of the subject (e.g., a camera or other image capture device) which most closely aligns the 3D rendering with the segmented image. The selected 3D pose can then be used to update the 3D tracker.

The semantic segmentation can use a small number of classes to allow accurate matching (or alignment) between an input image from a camera and a 2.5D model. For example, in some embodiments, the classes include facades, background, vertical building facade edges, referred to below as "vertical edges" and horizontal building facade edges, referred to below as "horizontal edges. The semantic segmentation outputs a segmented image representing each region in the captured image using these four classes. A respective 3D rendering is generated from the 2.5D model corresponding to each respective pose hypothesis. To take advantage of the information from the 2.5D maps, the method can align the 3D rendering (generated from the 2.5D maps) with the semantic segmentation of the input images.

The 3D rendering and semantic segmentation can be aligned by maximizing an image likelihood function over the pose, based on the 3D rendering from the pose (as determined by the tracking model) and the semantic segmentation of the input image. The method efficiently computes the likelihood function.

System Description

FIG. 1 is a functional block diagram of an exemplary image processing system 100 capable of determining a six degrees of freedom (6 DoF) pose of an image capture device 102. The 6 DoF pose include three position coordinates and three rotation coordinates. System 100 includes an image capture device 102 having image capture hardware (optics and an imaging sensor, not shown) capable of capturing images of a scene including object/environment 114. Although the image capture device 102 in the example of FIG. 1 is a smart phone, in other examples, the image capture device 102 can be a dedicated camera, a laptop computer, a tablet computer, an augmented reality system, a robotic system, an automotive vehicle having a camera mounted thereon, or the like.

The image capture device 102 may include a display to show captured images. The image capture device 102 may also be used for navigation based on, e.g., determining its latitude and longitude using signals from a satellite positioning system (SPS) or global positioning system (GPS), which includes satellite vehicle(s) 106, or any other appropriate source for determining position including cellular tower(s) 104 or wireless communication access points 105. As used herein an SPS may include any combination of one or more global and/or regional navigation satellite systems and/or augmentation systems, and SPS signals may include SPS, SPS-like, and/or other signals associated with such one or more SPS.

The image capture device 102 may also include orientation sensors, such as an inertial measurement unit (IMU), a digital compass, accelerometers or gyroscopes (not shown), which can be used to determine the orientation of the image capture device 102.

The image capture device 102 can use various wireless communication networks, including cellular towers 104 and from wireless communication access points 105, such as a wireless wide area network (WAN), a wireless local area network (LAN), a wireless personal area network (PAN). Further the image capture device 102 may access one or more servers 108 to obtain data, such as online and/or offline map data from a database 112, using various wireless communication networks via cellular towers 104 and from wireless communication access points 105, or using satellite vehicles 106.

A WAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A LAN may be an IEEE (Institute of Electrical and Electronics Engineers) 802.11x network, and a PAN may be a Bluetooth network, an IEEE 802.15x, or some other type of network. The techniques may also be implemented in conjunction with any combination of WAN, LAN and/or PAN.

As shown in FIG. 1, image capture device 102 is capturing an image of a scene 114 (which may contain one or more buildings) and determining a 6 DOF pose of image capture device 102. The image capture device 102 may access a network 110, such as the Internet. FIG. 1 schematically shows a direct connection between the image capture device 102 and the network 110, but the image capture device 102 can access the network via a variety of communications paths, such as a wireless wide area network (WAN), e.g., via cellular tower 104 or wireless communication access point 105, which is coupled to a server 108, which is coupled to access a database 112 storing information related to target objects. Database 112 may include data, including map data (e.g., 2D, 2.5D, or 3D map data) and may also include untextured models (e.g., 2D or 2.5D models) of a geographic area.

Although FIG. 1 shows one server 108, multiple servers may be used, as well as multiple databases 112. In some embodiments, image capture device 102 may perform 6 DoF pose determination locally on the mobile device. In other embodiments, image capture device 102 retrieves at least a portion of the database 112 from server 108 and stores the downloaded map data locally at the image capture device 102. The portion of a database obtained from server 108 may be based on the geographic location of image capture device 102 as determined by the positioning system. The portion of the database 112 obtained from server 108 may depend upon the particular application on the image capture device 102. Alternatively, the object detection and tracking may be performed by the server 108 (or other server), where either the captured image itself or the extracted features from the captured image are provided to the server 108 by the image capture device 102. In one embodiment, online map data is stored locally by image capture device 102, while offline map data is stored in the cloud in database 112.

FIG. 2 shows another example, in which an automotive vehicle 200 has two image capture devices 202, 204 mounted thereto. The image capture device 202 is a front mounted camera facing in a forward direction 206. The image capture device 204 is a side mounted camera 204 facing in sideways direction 208. The automotive vehicle 200 has a wireless communication interface to the network 110 (FIG. 1). Although not shown in FIG. 2, the automotive vehicle 200 can have wireless communications to the other communications components shown in FIG. 1. The image capture device 204 of automotive vehicle 200 is capturing images of a scene 210, including buildings 220, 230 and 240. Building 220 has windows 222, 226 and a door 224. Building 230 has windows 232, 236 and a door 234. Building 240 has windows 242, 246 and a door 244. The automotive vehicle 200 has a system 250 for determining the 6 DoF pose of the automotive vehicle using an image of the buildings and 2.5 D map data from database 112 (FIG. 1).

FIG. 3 is a block diagram of an example of the system 250 for determining a pose of an image capture device 102. The system 250 provides scalability and efficiency for mobile outdoor applications. The system does not rely on pre-registered image collections, but instead leverages easily obtainable 2.5D model 302 (e.g., city models) and semantic segmentation block 308.

The system 250 has a processor 320 coupled to access image data. The processor 320 can be a general purpose processor configured by computer program code, or an application specific integrated circuit (ASIC). The image capture device 102 can be connected via wired or wireless interface to the image capture device 102 (e.g., via universal serial bus, USB), and can provide the image data directly to the processor 320. The image capture device 102 can provide the image data in one or more of a variety of formats. For example, as shown in FIG. 3, the image capture device 102 can provide RGB color images to the semantic segmentation block to take advantage of the luminance and color information for classification. The image capture device 102 can also provide monochrome (e.g., grayscale) images to the 3D Tracker 314. The grayscale images provide edge and contrast information suitable for a variety of tracking models. The processor 320 can also be coupled to a non-transitory, machine readable storage medium 330 storing the image. The processor 320 can access one or more images of a scene captured by the image capture device 102.

The non-transitory, machine-readable storage medium 320 is coupled to the processor 320 and encoded with computer program code 334 for execution by the processor 320. The machine-readable storage medium 320 also stores static and dynamic data used by the processor 320.

The blocks 308, 310, 314, and 316 are executed by the processor 320.

The tracker 314 estimates the relative motion between consecutive frames and continuously generates an estimated pose of the image capture device 102. The 3D tracker 314 is configured to generate an initial pose of the image capture device 102, and output the initial pose.

The exemplary semantic segmentation block 308 can be configured to perform semantic segmentation of a captured image of a scene, using a CNN or FCN. The semantic segmentation block 308 performs: image rectification, classification of scene components within the rectified image into facades, vertical edge, horizontal edges and background, division of the image into regions (e.g., columns), and classification of each column into one of a predetermined number of combinations of facades, vertical edge, horizontal edges and background. For example, in one embodiment, each column is of equal size, one pixel wide, and all of the columns can be classified into three combinations of one or more of facades, vertical edge, horizontal edges and/or background. In some embodiments, semantic segmentation block 308 has a neural network (e.g., a CNN or FCN) to perform the semantic segmentation of the image and generate a segmented image, as described in greater detail below.

The pose hypothesis sampling block 310 receives the segmented image from the semantic segmentation block 308 and receives the initial pose from the 3D tracker 314. The pose hypothesis sampling block 310 generates a respective 3D rendering of the scene corresponding to a respective field of view of the image capture device in each respective one of a plurality of poses around the initial pose. The pose hypothesis sampling block 310 calculates respective pose probabilities for a plurality of pose hypotheses, and selects one of the pose hypotheses. The pose hypothesis sampling block 310 selects selecting a pose from the plurality of poses, such that the selected pose aligns the 3D rendering with the segmented image. The pose hypothesis sampling block 310 outputs the selected pose.

The pose correction block 316 means for updating the 3D tracker based on the selected pose. The pose correction block 316 receives the pose selection from the pose hypothesis sampling block 310. The pose correction block 316 determines revised coefficients and values for updating the 3D tracker 314 based on the selected pose from the pose hypothesis sampling block 310.

Each of the blocks 308, 310, 314, and 316 is described in detail below.

Figure 3A:
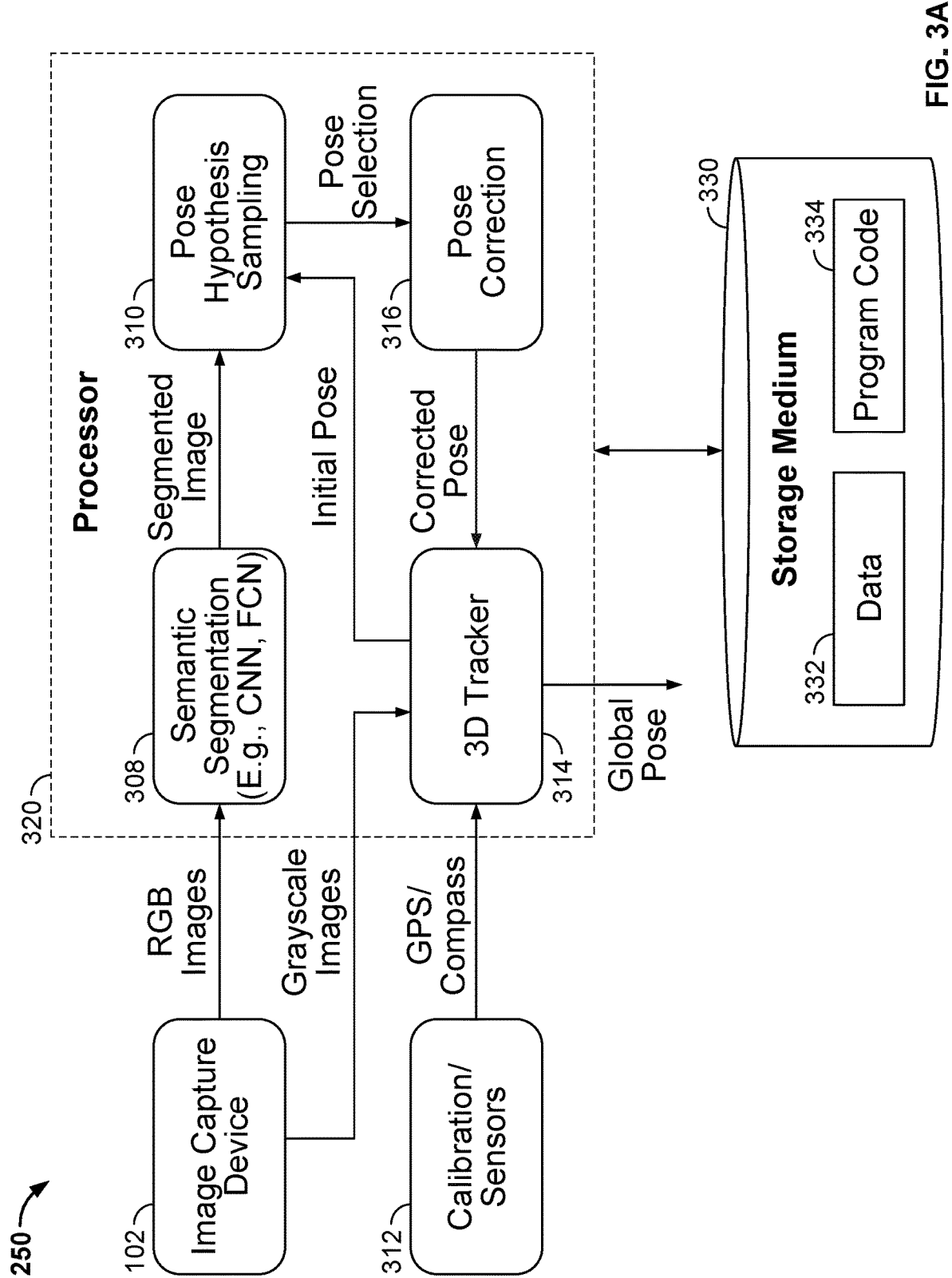
FIG. 3A is a block diagram of the system of FIG. 1.
Figure 3B:
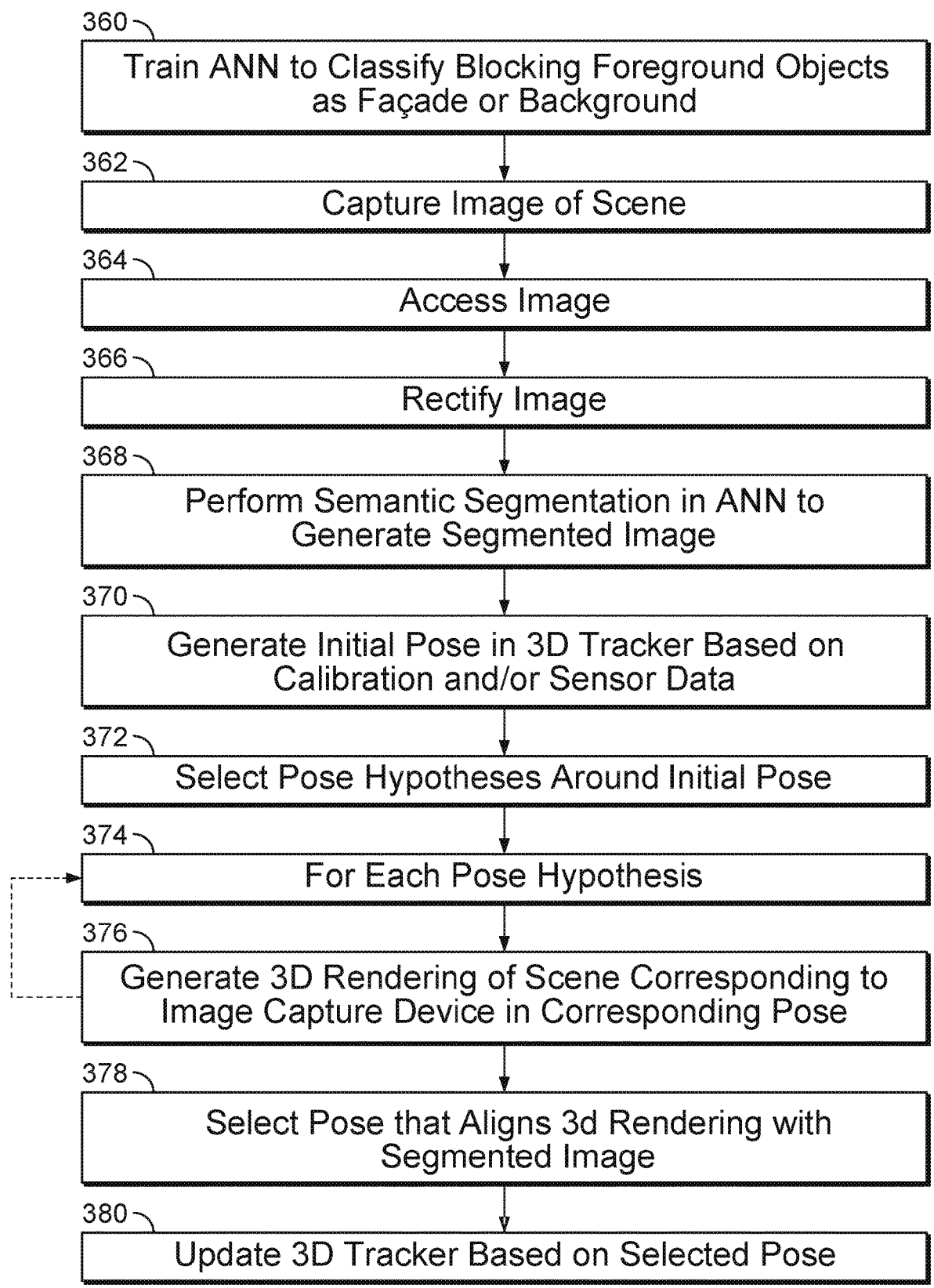
FIG. 3B is a flow chart of a method of using the system of FIG. 3A.

FIG. 3B is a flow chart of an exemplary method performed by the system 250 (shown in FIG. 3).

In block 360, the ANN (e.g., CNN or FCN) of the semantic segmentation block is trained to classify blocking foreground objects as façade, vertical edge, horizontal edge, or background. A training set containing labeled images of buildings is input. Foreground objects that partially block the facade (including pedestrians, automotive vehicles, shrubs, trees, or the like) are labeled as portions of the facade. Foreground objects that partially block the a vertical edge (or horizontal edge) of a façade—including pedestrians, automotive vehicles, shrubs, trees, or the like—are labeled as portions of the vertical edge (or horizontal edge). Foreground objects that partially block the background outside the perimeter of the building (including pedestrians, automotive vehicles, shrubs, trees, or the like) are labeled as portions of the background.

At block 362, the image capture device 102 captures an image of a scene. The image data can be stored in a non-volatile storage medium 330 (FIG. 3) of the system 250.

At block 364 the system 250 accesses the image data. The image data can be retrieved from the non-volatile storage medium 330 (FIG. 3) of the system 250, or the processor 320 can process the image data directly upon receipt from the image capture device 102.

At block 366, the semantic segmentation block 308 rectifies the image. The semantic segmentation block can obtain a true vertical direction from the sensors 312 (FIG. 3A). The semantic segmentation block 308 determines the angles between lines in the image and the true vertical direction. The semantic segmentation block 308 applies a rotation, a lens distortion correction, and/or a perspective correction, so that vertical edges of the buildings in the image are parallel to the vertical edges of the image.

At block 368, the semantic segmentation block processes the image in the ANN to generate a segmented image. The ANN performs the semantic segmentation so as to classify each region (column) of the image as containing a sequence having one or more of a predetermined number of classes. For example, the classes can include a facades, vertical edges, horizontal edges and background. All of the features in the image are assigned to one of these four classes. An example of a sequence having one or more of the predetermined number of classes is: background, horizontal edge, façade, horizontal edge, and background.

At block 370, the 3D tracker 314 generates the initial pose based on calibration data, sensor data, position data and/or motion data from one or more sensors. The 3D tracker 314 provides the initial pose to the pose hypothesis sampling block 310.

At block 372, the pose hypothesis sampling block 310 generates a search space based on the initial pose. For example, the search space can contain a plurality of pose hypotheses around and including the initial pose. The pose hypothesis sampling block 310 can use the calibration data, position data or motion data to determine the pose search space containing the plurality of poses. For precise geolocation, the pose hypotheses can be placed close together around the initial pose.

At block 374, the pose hypothesis sampling block 310 performs a loop containing block 376 for each respective pose hypothesis.

At block 376, the pose hypothesis sampling block 310 generates a 3D rendering of the scene corresponding to the respective pose. That is, the rendering defines how the scene would appear in an image if the image capture device 102 is located in the pose corresponding to the pose hypothesis.

At block 378, the pose hypothesis sampling block 310 selects one of the poses corresponding to the pose hypothesis that aligns the 3D rendering corresponding to that pose hypothesis with the segmented image. An example of a selection process is described below.

At block 380, the pose correction block determines which update to make to the 3D tracker 314 to correct for drift so the 3D tracker outputs a pose that is aligned with the selected pose.

3D Tracker 314

Given an input image from image capture device 306, the CNN or FCN of semantic segmentation block 308 generates a semantic representation of the image. The 3D tracker 314 receives a grayscale (e.g., luminance) representation of the image and calibration and/or sensor data from the calibration/sensors block 312 (e.g., GPS data, compass data, or data from inertial measurement unit, gyro or accelerometer). The 3D tracker 314 uses the image data and sensor data to provide an initial pose to the pose hypothesis sampling block 310. The 3D tracker 314 provides a means for generating an initial pose of the image capture device 102.

The system 250 can include one or more trackers 314. A variety of trackers 314 can be used, including but not limited to SLAM and visual odometry. SLAM provides a capability for reconstruction of structure (e.g., buildings in the scene). SLAM is an advantageous tracker in cases where the image capture device (e.g., 204, FIG. 2) is pointed in a direction (e.g., 208, FIG. 2) normal to the direction of motion (e.g. 206, FIG. 2) of the image capture device. For example, SLAM can be advantageous for a side-facing camera of an automotive vehicle (e.g., image capture device 202, FIG. 2). Visual odometry does not provide explicit structure recovery, but visual odometry can provide good accuracy in cases where the image capture device (e.g., 202, FIG. 2) is pointed in the direction of motion (e.g., 206, FIG. 2) of the image capture device. For example, visual odometry can be advantageous for a front-facing camera of an automotive vehicle.

Referring to FIG. 4, the 3D tracker 314 can include a SLAM tracker 452, a visual odometry tracker 454, or both. One example of a 3D tracker block 314 for a vehicle 200—having both a front mounted camera 202 and a side mounted camera 204, as shown in FIG. 2—includes both a SLAM tracker 452 and a visual odometry tracker 454. The 3D tracker block 314 has a selection block 450 for selecting one of the trackers 452 or 454 when an image is input from one of the cameras 202, 204 (FIG. 2). When the front-mounted camera 202 captures an image, the visual odometry tracker 454 is used. When the side-mounted camera 204 captures an image, the SLAM tracker 452 is used. Both trackers 452, 454 can be susceptible to drift or accumulated errors, so the system 250 corrects the errors and updates the trackers 452, 454. When updated based on the 3D rendering and semantic segmentation, both trackers 452, 454 provide more accurate poses within their respective tracking loops.

In one example having two trackers, the first tracker 452 is a key frame based SLAM approach similar to Parallel Tracking and Mapping (PTAM). A non-limiting example of a PTAM approach is described in J. Ventura, et al., "Approximated Relative Pose Solvers for Efficient Camera Motion Estimation," Workshop on Computer Vision in Vehicle Technology, Computer Vision-ECCV 2014 Workshops, pp 180-193. Key frame based SLAM approaches are used for side-ways motion. After covering a reasonable camera baseline between the initial key frames, the camera pose is continuously estimated and a 3D structure is recovered using fast-corners and image descriptors.

In the case where the 3D tracker 314 includes SLAM based tracker 452, the SLAM based 3D tracker 452 is corrected using a new key frame (captured image) after at least a predetermined time has passed from the most recent previous key frame and the image capturing device has moved at least a predetermined distance from a nearest key point. Each time an image key frame is captured, the SLAM based 3D tracker 452 performs the following procedure. The SLAM based 3D tracker 452 generates an initial pose estimate. The pose hypothesis sampling block 310 projects map points onto the image based on the initial pose estimate from SLAM based 3D tracker 452. The pose hypothesis sampling block 310 searches for coarse features of the 3D rendering in the image. The pose hypothesis sampling block 310 computes the likelihood that each coarse feature of the image corresponds to each respective one of the four semantic classes (facade, vertical edge, horizontal edge, and background) in the image, given a pose. The pose hypothesis sampling block 310 then repeats the likelihood computation for a plurality of pose hypotheses around the initial pose estimate from SLAM based 3D tracker 452.

The second tracker 454 is based on a lightweight Ventura-Arth-Lepetit pose solver technique with visual odometry. Rotation is assumed to be small, and the rotation matrix is approximated as first order. The rotation parameters can be solved separately from the translation, and the number of rotation equations to be solved is reduced by about two thirds. The relative motion between consecutive keyframes is recovered by first estimating the optical flow using a Lucas-Kanade method, which registers images by using a spatial intensity gradient of images to determine the order in which pixels of the images are compared to reduce the number of potential matches to be evaluated. Then, epipolar geometry is estimated through linearized Groebner pose solvers. These solvers give good performance in domains with restricted camera motion, such as forward vehicular motion, for example.

After relative motion estimation, in both tracking approaches the frames and the initial pose estimates are forwarded to the semantic segmentation block 308 and pose hypothesis sampling block 310, which corrects the drift of the tracker(s) 314.

In other embodiments, the 3D tracker 314 can use a variety of other approaches to perform relative tracking between consecutive image frames. The 3D tracker 314 is not limited to SLAM, visual odometry, or trackers having explicit 3D structure recovery. 3D tracker 314 can use other different tracking approaches, either alone or in combination, for different application domains.

Semantic Segmentation 308

FIG. 5 is a block diagram of an exemplary semantic segmentation block 308, which provides a means for performing a semantic segmentation of an image captured by the image capture device to generate a segmented image. Semantic segmentation block 308 can use deep learning methods. The semantic segmentation block 308 includes image rectification block 500, ANN (e.g., CNN or FCN) 501, integral column classification block 502, and column transition point identification block 503.

Figure 6A:
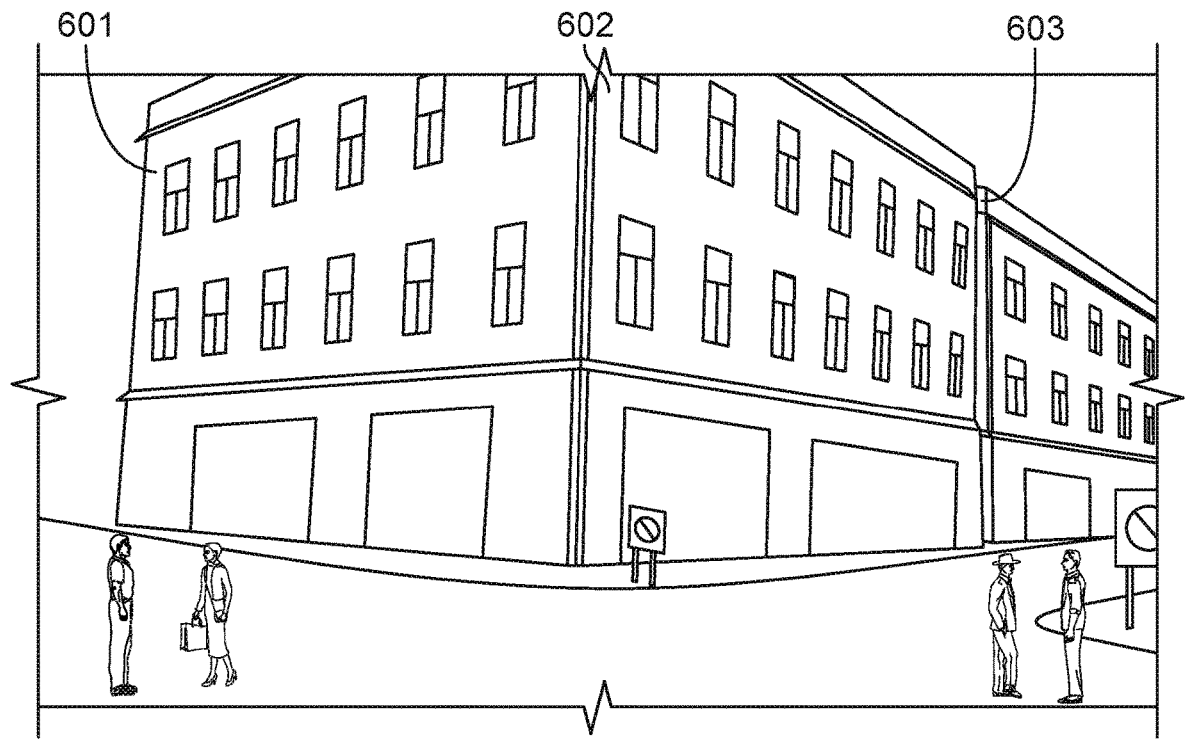
FIG. 6A is a sample image of an urban scene.
Figure 6B:
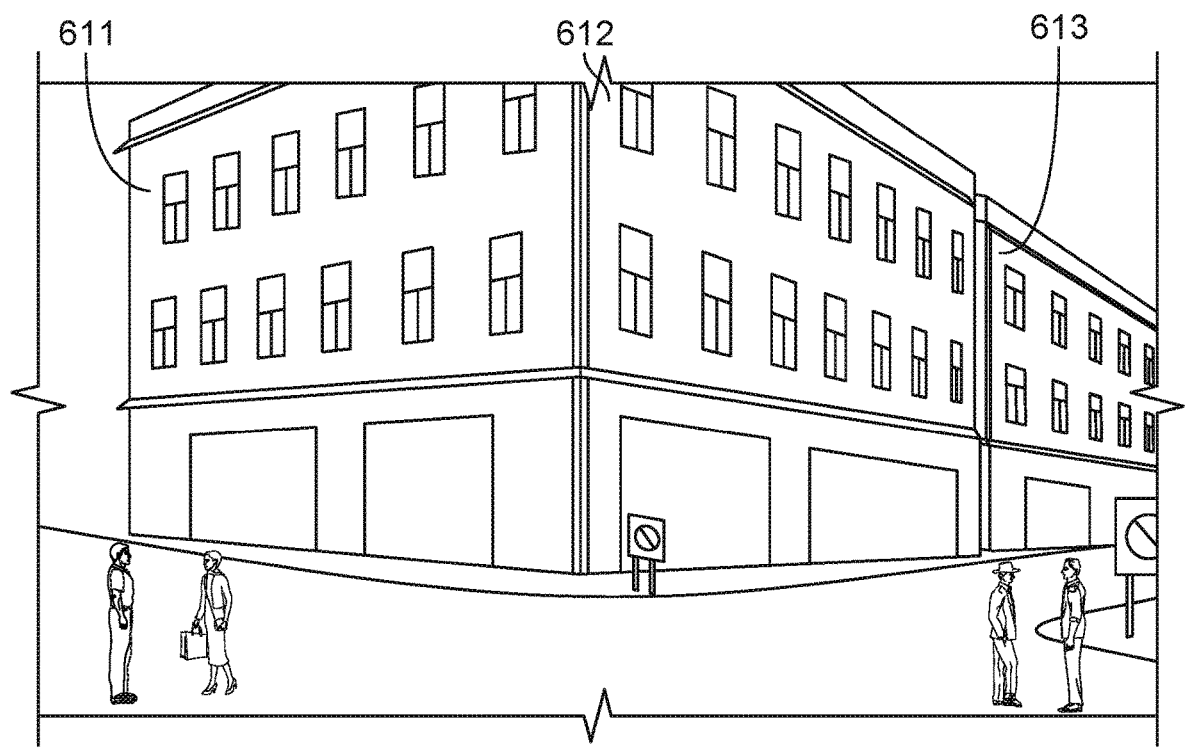
FIG. 6B is a rectified version of the image shown in FIG. 6A.

The image rectification block 500 can obtain a true vertical direction from the sensors 312 (e.g., a gravity sensor, gyroscope, IMU, or the like) shown in FIG. 3A. The image rectification block 500 determines the angles between approximately-vertical lines in the image and the true vertical direction. The image rectification block 500 applies a rotation, a lens distortion correction, and/or a perspective correction, so that vertical edges of the buildings in the image are parallel to the vertical edges of the image. FIGS. 6A and 6B show an example of the operation of image rectification block 500 of FIG. 5. The image of FIG. 6A has approximately-vertical edges 601, 602, 603. The image rectification block outputs a rectified version of the image as shown in FIG. 6B. The edges 611, 612 and 613 are vertical edges corresponding to the approximately-vertical edges 601, 602, and 603, respectively, in FIG. 6A

Figure 7C:
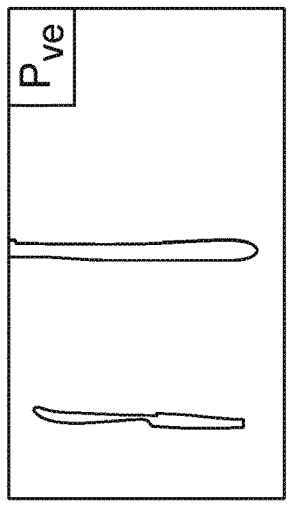
FIGS. 7B-7E show probability maps for four classes of structures in the image of FIG. 7A.
Figure 7F:
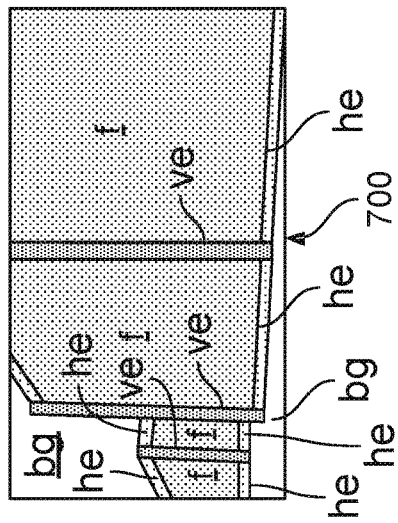
FIG. 7F shows an example of a 3D rendering of a 2.5D city model corresponding to the captured image of FIG. 7A.
Figure 7B:
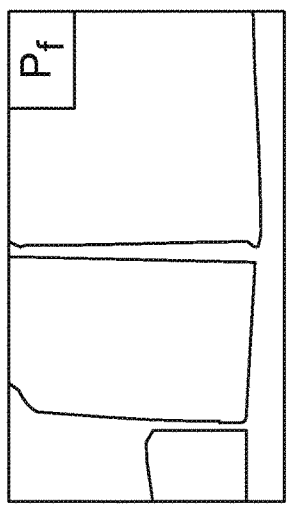
Figure 7E:
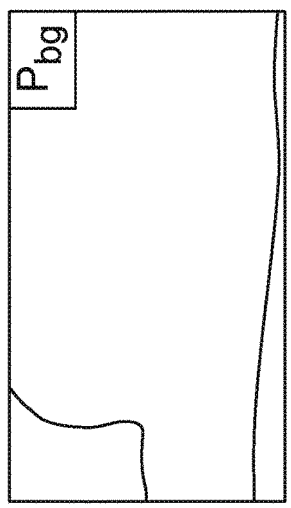
Figure 7A:
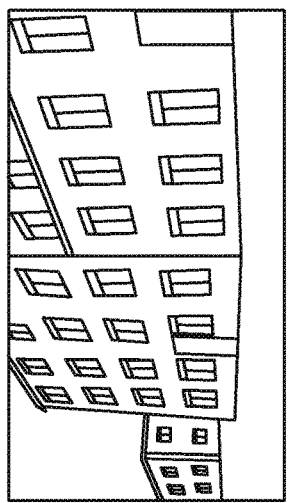
FIG. 7A is a sample image of an urban scene.

FIGS. 7A-7F show the operation of the CNN or FCN 501 (FIG. 5). FIG. 7A shows a rectified image that is input to the CNN or ANN 501. According to some embodiments, a CNN or FCN is used for dividing an image into a plurality of regions, each region having a plurality of pixels. The semantic segmentation is performed by a CNN or FCN configured to classify each of the plurality of pixels as belonging to one of a predetermined number of classes that correspond to elements of the 2.5D map. These classes can include building facades, vertical edges and horizontal edges of the building facades, and background. For each pixel in the imaging sensor of the image capture device 102 (FIG. 1), the CNN or FCN 501 determines a respective probability that the feature captured by that pixel belongs to a respective classification.

The output of the segmentation step for a given red-green-blue (RGB) image I is a set of probability maps having the same resolution as I, one for each of the four classes: facade (f), vertical edge (ve), horizontal edge (he) and background (bg):

$$S(I) = \{P_f, P_{ve}, Pe_{he}, P_{bg}\} \tag{1}$$

Figure 7D:
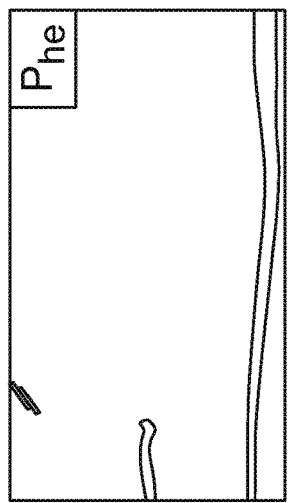

For example, the CNN or ANN 501 determines: $P_f$, the probability that the pixel captures light from a façade, $P_{ve}$, the probability that the pixel captures light from a vertical edge of a facade, $P_{he}$, the probability that the pixel captures light from a horizontal edge of a facade, and $P_{bg}$, the probability that the pixel captures light from a background. Each pixel is classified as belonging to the class having the highest probability. For each classification, the respective probability values for each respective pixel assigned to the class are collected in a probability map for the classification. For example, FIG. 7B-7E provide an example of the probability maps output by the semantic segmentation. FIG. 7B shows the probability map for Pf; FIG. 7C shows the probability map for Pve; FIG. 7D shows the probability map for Phe; and FIG. 7E shows the probability map for Pbg. In the probability maps in FIGS. 7B-7E, gray areas in each probability map show the areas of pixels classified in the respective class corresponding to the probability map.

FIG. 7F shows an example of a 3D rendering of a 2.5D city model corresponding to the captured image of FIG. 7A, as viewed from a certain pose hypothesis. A plurality of 3D renderings of the scene are generated. Each of the plurality of 3D renderings corresponding to one of a plurality of poses. The plurality of poses are chosen based on the initial pose. The plurality of poses including the initial pose, and the calibration data, position data or motion data are used to determine a pose search space containing the plurality of poses. For example, each of the plurality of 3D renderings can correspond to one of a plurality of pose hypotheses around and including an initial estimated 3D pose. The pose hypothesis sampling block 310 (FIG. 3) selects the pose hypothesis for which the corresponding rendering optimally fits the semantic segmentation results (i.e., the probability maps).

In some embodiments, all image features can be classified as either facades, vertical edges, horizontal edges, or background. Other static objects, which do not block a facade (e.g., roofs, ground, sky or vegetation), are all classified as background. Transitory objects (e.g., cars and pedestrians) passing in front of the facades or static background objects are given the classification of the static objects behind the transitory objects.

For example, the CNN or FCN can be trained to ignore the transitory objects using a stage-wise training procedure, such as a procedure described in J. Long, et al., "*Fully Convolutional Networks for Semantic Segmentation*", Conference on Computer Vision and Pattern Recognition, 2015.

As shown in FIG. 7F, other foreground items are typically classified as the classes of the elements they block. For example, doors and windows are treated as part of the facade within which they are located. Also, shrubbery, automobiles, and pedestrians are ignored and classified as part of the facade or background behind the shrubbery, automobiles, or pedestrians. The CNN or FCN of semantic segmentation block 308 learns to ignore non-architectural objects within a captured image through supervised learning.

Figure 8A:
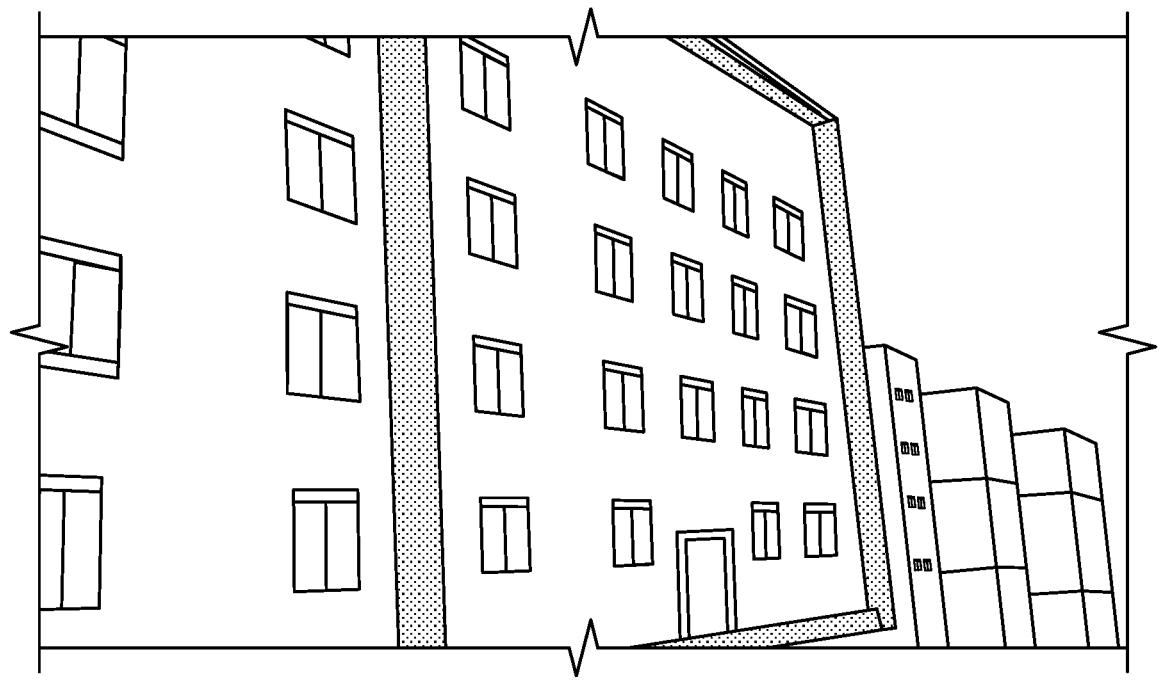
FIG. 8A is another sample of an urban scene.
Figure 8B:
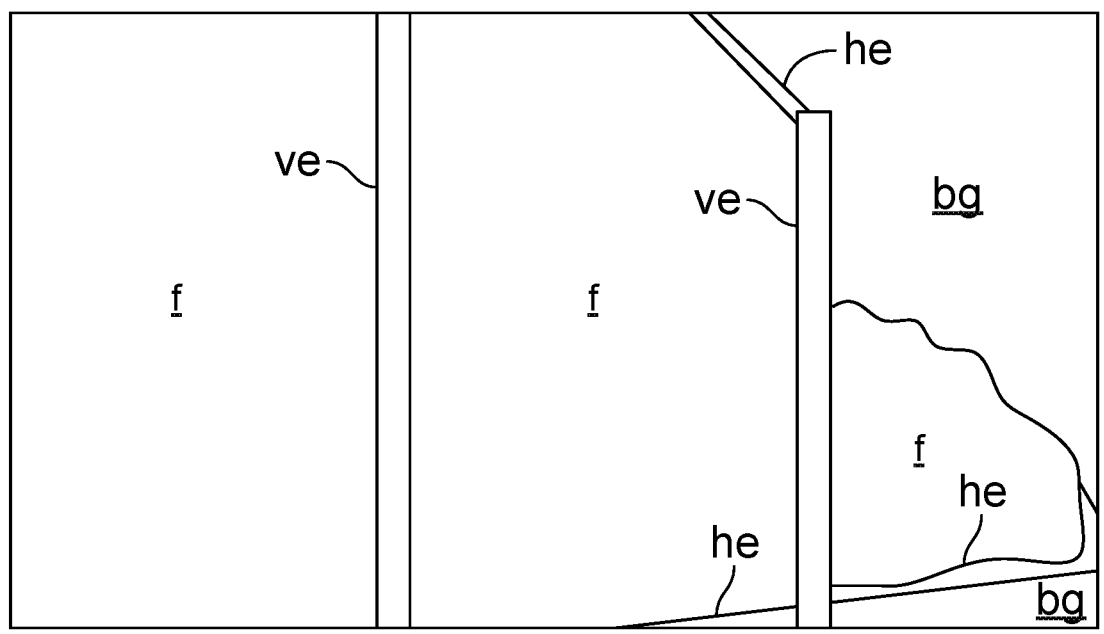
FIG. 8B shows a segmented image corresponding to the image of FIG. 8A.

FIGS. 8A and 8B show another example of a captured image (FIG. 8A), and a corresponding segmented image as processed by the CNN or FCN. The individual probability maps for the image of FIG. 8A is omitted.

Training

In one embodiment, the training begins with semantic information from a coarse network (e.g., FCN-32s as described in J. Long, E. Shelhamer, and T. Darrell. "Fully Convolutional Networks for Semantic Segmentation", Conference on Computer Vision and Pattern Recognition, 2015.). The coarse network can be initialized from VGG-16 (described in K. Simonyan and A. Zisserman. "Very Deep Convolutional Networks for Large-Scale Image Recognition", CoRR, abs/1409.1556, 2014.). The network is fine-tuned with data, and then the resulting model is used to initialize the weights of a more fine-grained network (FCN-16s). This process is repeated in order to compute the final segmentation network having an 8 pixels prediction stride (FCN-8s).

Figure 9A:
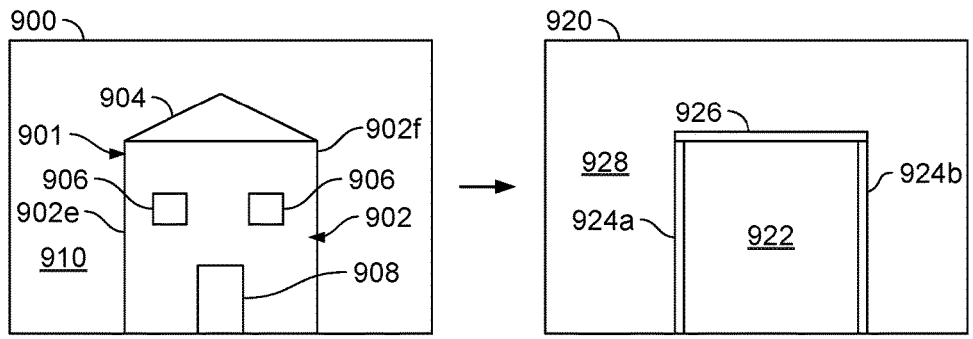
FIGS. 9A-9C show examples of labeled training images used to train the convolutional neural network (or fully convolutional network) of FIG. 3A.
Figure 9B:
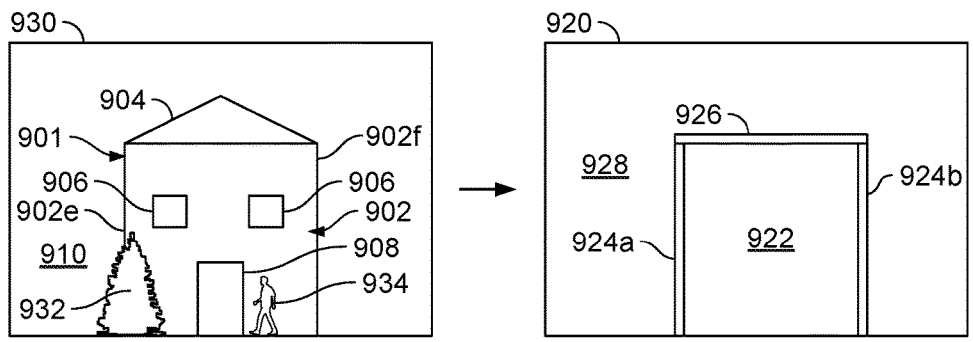
Figure 9C:
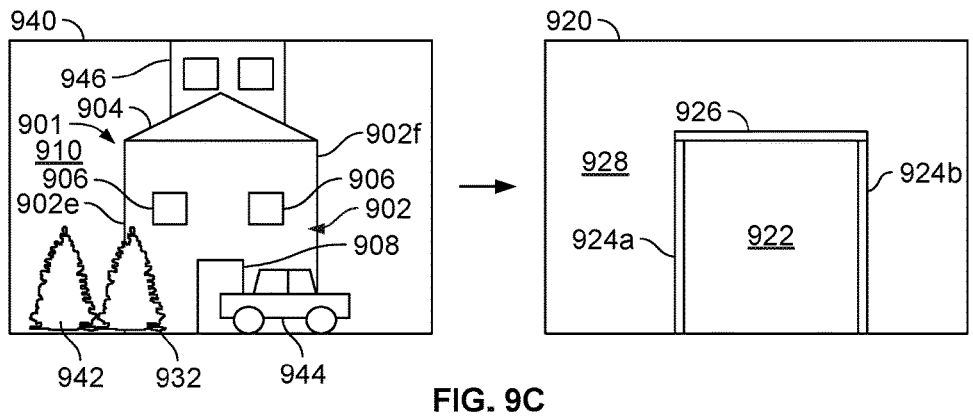

FIGS. 9A-9C show a sample of training images and the corresponding labeled segmented images input during training.

FIG. 9A shows the handling of architectural features. An input labeled image 900 has a building 901 with a facade 902, vertical edges 902e and 902f, a roof 904, windows 906, and a door 908, set against a background 910. The semantic segmentation block 308 outputs the corresponding segmented image 920 having a facade 922, a pair of vertical edges 924a, 924b and a horizontal edge 926. The windows 906, and door 908 are ignored, and considered a part of an uninterrupted facade 922. The roof 904 is ignored, and treated as part of an uninterrupted background 928. During training any small architectural features, such as windows, doors, brickwork, stone, siding planks, shakes, trim, ledges, flagpoles, satellite dishes or the like blocking a portion of the facade of the training images are labeled as part of the facade.

FIG. 9B shows a second training image 930 including the same building 901 or a building having a facade 902 configured identically to the façade 902 shown in FIG. 9A, including a roof 904, windows 906, and a door 908, set against a background 910. Training image 930 also includes a pedestrian 934 and a tree 932. The semantic segmentation block 308 outputs the corresponding segmented image 920 having a facade 922, a pair of vertical edges 924a, 924b. a horizontal edge 926, and a background 928. In addition to the roof 904, windows 906 and door 908, the tree 932 and pedestrian 934 partially blocking the facade 902 and vertical edge 902e are also ignored, and treated as part of the facade and vertical edge, respectively. The result of performing semantic segmentation on image 930 is the same segmented image 920 as in FIG. 9A. The portion of the tree 932 partially blocking the left vertical edge 902e of the facade 902 is ignored, and treated as part of the left vertical edge 924a in the labeled segmented image 920.

FIG. 9C shows a third training image 940 including the same building 901 or a building having a facade 902 configured identically to the façade 902 in FIG. 9A, including a roof 904, windows 906, and a door 908, set against a background 910. Training image 940 also includes a tree 932 partially blocking the façade 902 and the vertical edge 902e of the facade, a second tree 942 partially blocking the background 910, and an automotive vehicle 944 partially blocking the façade 902, the vertical edge 902f of the façade 902, and partially blocking the background 910. The portion of the tree 932 partially blocking the left vertical edge 902e of the facade 902 is ignored, and treated as part of the left vertical edge 924a in the labeled segmented image 920. A second building 946 is behind the building 901 and is partially visible above the roof 904. The semantic segmentation block 308 again outputs the corresponding segmented image 920 having a facade 922, a pair of vertical edges 924a, 924b and a horizontal edge 926. In addition to the roof 904, windows 906 and door 908, and the tree 932, the semantic segmentation block 308 also ignores portions of the second tree 942 and automotive vehicle 944 partially blocking the façade 902, the vertical edge 902f and the background 910. Also, the semantic segmentation block 308 also ignores the building 946 behind the building 901.

The tree 942 and the portion of the automotive vehicle 944 partially blocking the background 910 are treated as part of the background 910. The building 946 behind the building 901 is treated as part of the background. The portion of the automotive vehicle 944 blocking the vertical edge 902f is treated as part of the vertical edge 924b. The portion of the automotive vehicle 944 partially blocking the facade 902 is treated as part of the facade 902. More generally, during training, objects in the training images which partially block a facade, vertical edge, horizontal edge, or background are labeled as belonging to the same class as the facade or background. The result of performing semantic segmentation on image 940 is the same segmented image 920 as in FIG. 9A. For example, a shrub within the outline of a facade is labeled as a facade. Similarly, the sky is labeled as background, and an airplane or bird (not shown) within an area of the sky is also labeled as background.

FIGS. 9A-9C are only exemplary. The training dataset can include a large number (e.g., 1000 or more) of labeled images, having a variety of building configurations, background configurations and poses, and a large number of blocking objects partially blocking the façade, vertical edges, horizontal edges and/or the background. For example, in an experiment, 82 video sequences were recorded, having an average length of about 10 seconds. The 82 video sequences yielded a training set of 10,846 images. The training set was augmented by horizontally mirroring each image, yielding a training set of 21,692 samples in total.

The semantic segmentation block 308 is powerful enough to classify blocking objects at run-time as belonging to the class of the elements they block. This is the desired behavior, because minor objects (e.g., windows, shrubs) and transitory scene elements (e.g., pedestrians or cars) are not relevant to pose determination.

In a variation of the training method, to create ground truth data with reduced effort, one can record short video sequences in an urban environment. A model and key point-based 3D tracking system can use untextured 2.5D models, With this approach, one can label the facades and their edges efficiently.

If the buildings in the image have a configuration that allows discrimination of the boundaries between buildings, segmenting only the facades (without separately classifying edges) may be sufficient for the pose identification application. On the other hand, if the buildings are aligned in a row (As shown in FIG. 2), classifying vertical and horizontal edges separately from the facades permits more reliable tracking.

Integral Column Representation

Figure 10A:
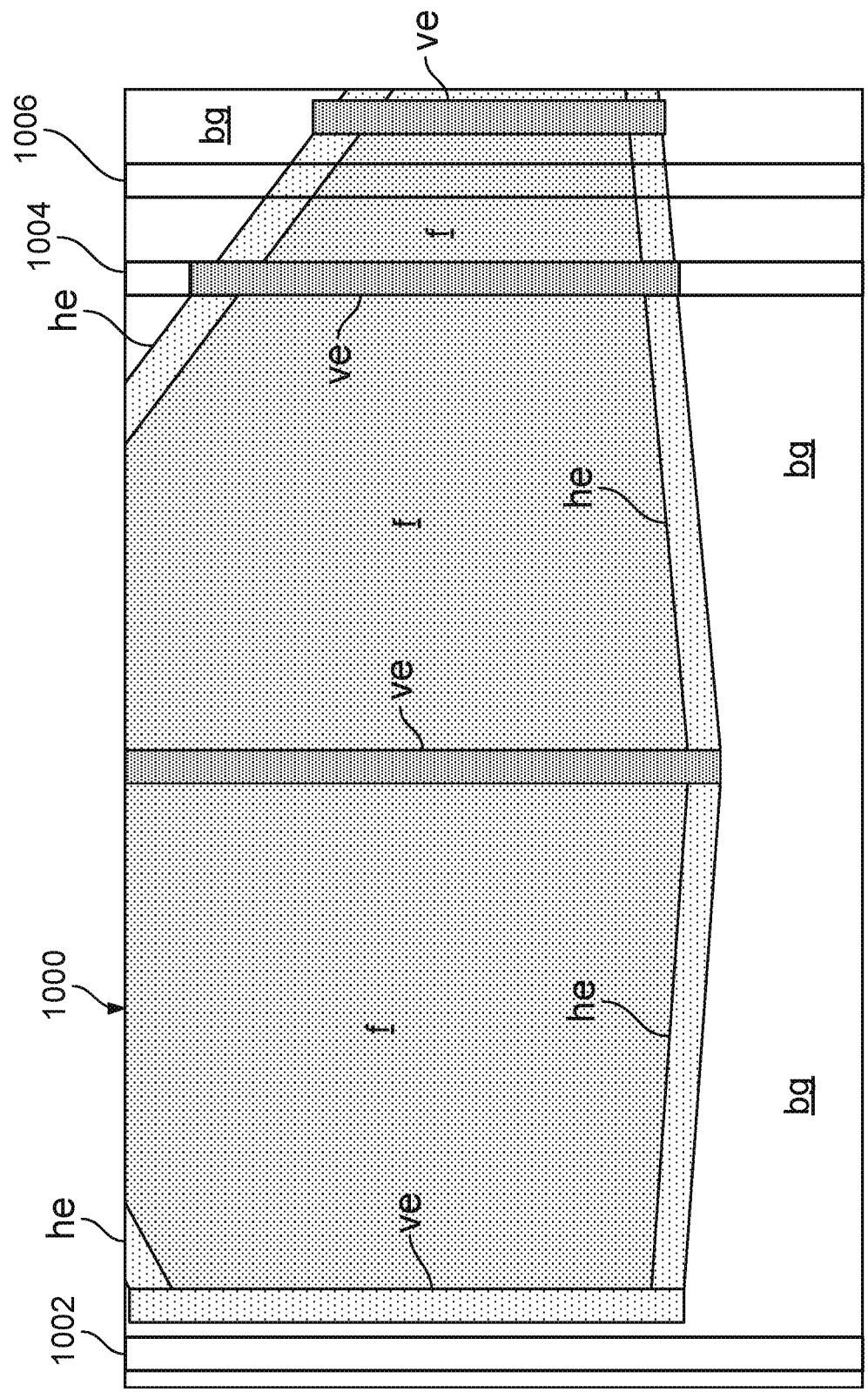
FIGS. 10A-10C show the integral column representation of segmented images.
Figure 10C:
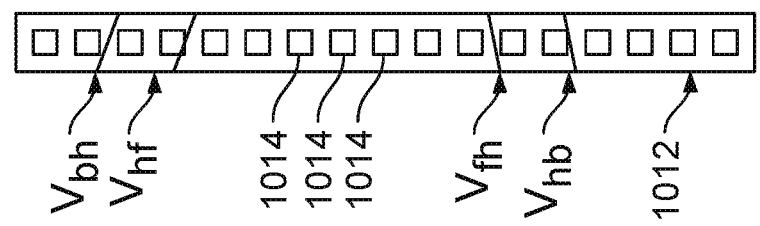
Figure 10B:
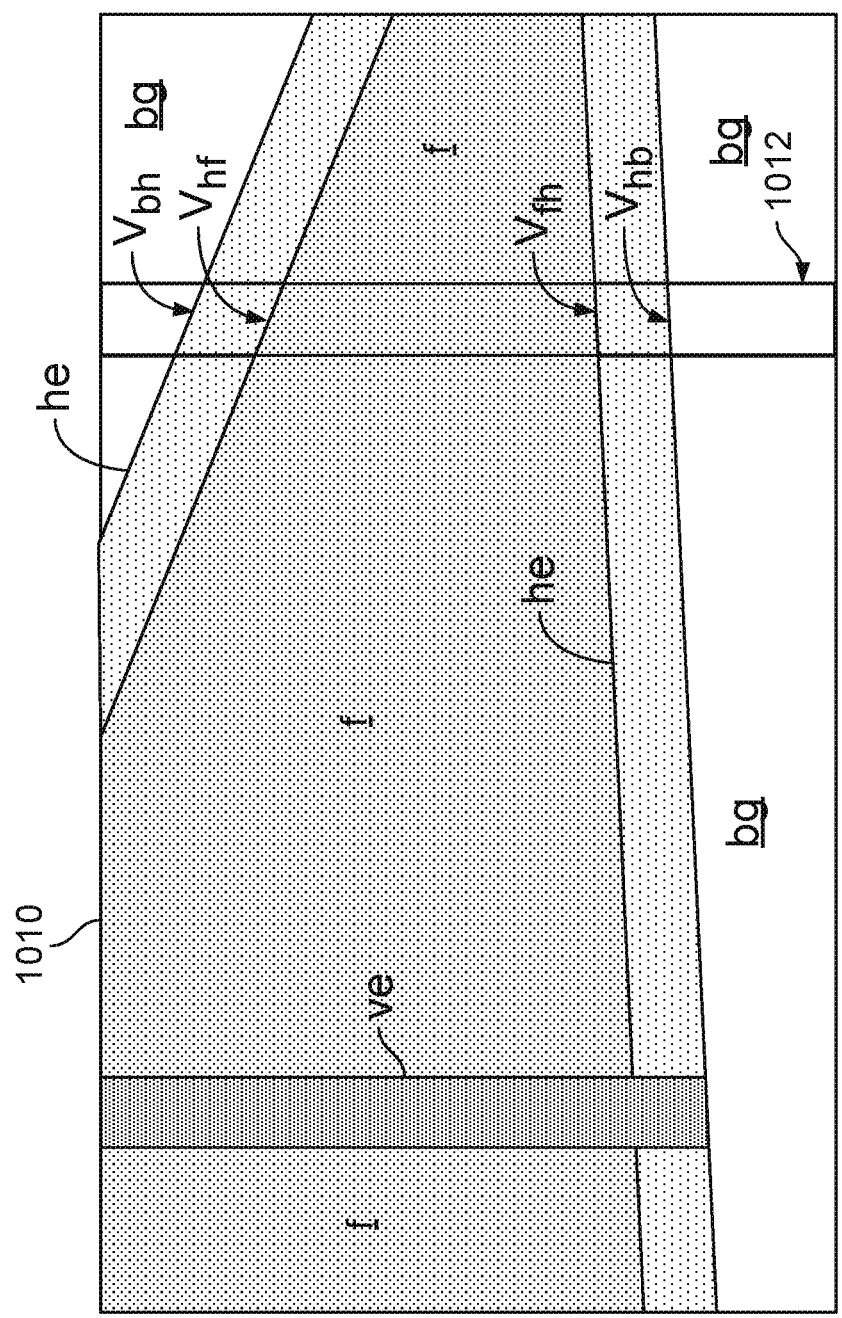

FIGS. 10A to 10C show an integral column representation of a segmented image. The integral column representation provides a rapid method for computing the probability that a 3D rendering corresponding to a pose hypothesis is aligned with the captured image.

Referring first to FIG. 10A, the integral column representation divides the segmented image 1000 into a plurality of regions in the form of columns. Each region (column) can be one pixel wide. Because the image is rectified before semantic segmentation, the vertical edges of facades are all aligned with parallel to the columns. In this configuration, with four classes (facades, vertical edges, horizontal edges, and background), the integral columns can all be described by one of three possible sequence types:

Type 1: BG=>HE=>F=>HE=>BG (column 1006)
Type 2: BG=>VE=>BG (column 1004)
Type 3: BG (column 1002)

The Integral column classification block 502 (FIG. 5) identifies the column type for each one-dimensional (1D) column of pixels.

The column transition point identification block 503 (FIG. 5) identifies the transition points between any pair of adjacent pixels having different classes from each other. In FIGS. 10B and 10C, the transition points between classes for each column in image 1010 are identified. For example, the column 1012 comprises a single column of pixels 1014. Column 1012 is of the first column type: BG=>HE=>F=>HE=>BG. There are four transition points between pixels of different classes. The four points are labeled (from top to bottom) $V_{bh}$, $V_{hf}$, $V_{fh}$, and $V_{hb}$. All of the pixels between any adjacent pair of the four transition points have the same class. For example, all the pixels between $V_{bh}$ and $V_{hf}$ are horizontal edge pixels. All the pixels between $V_{hf}$ and $V_{fh}$ are façade pixels. All the pixels between $V_{fh}$ and $V_{hb}$ are horizontal edge pixels. This simplifies computations, because the probability for the entire column can be computed from $V_{bh}$, $V_{hf}$, $V_{fh}$, and $V_{hb}$ without using the intervening pixels. The respective probabilities for each region can be determined based on a sequence type of the region (Type 1, Type 2, or Type 3, defined above) and a location of each transition between adjacent pixels belonging to respectively different classes in the plurality of classes. Also, because the integral column representation only depends on the semantic segmentation, and is used in conjunction with the 2.5D maps to generate each 3D rendering, the integral column representation can be computed once for a captured image, and the same integral column representation can be used for all of the pose hypotheses.

Pose Hypothesis Sampling 310

Figure 11:
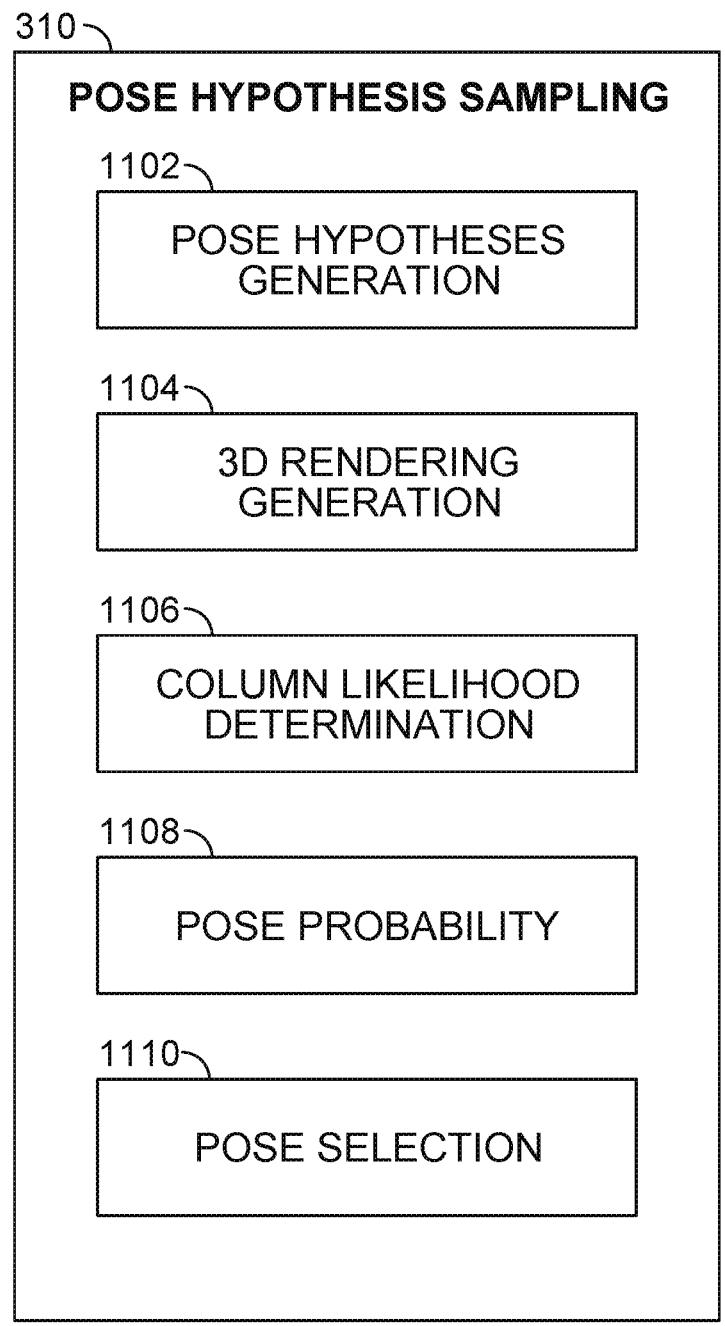
FIG. 11 is a block diagram of the pose hypothesis sampling block of FIG. 3A.

The pose hypothesis sampling block 310 provides a means for determining a respective probability that each respective 3D rendering aligns with the segmented image, wherein the selecting is based on the determined probabilities. FIG. 11 is a block diagram of the pose hypothesis sampling block 310 (FIG. 3A). The pose hypothesis sampling block 1102 includes a pose hypothesis generation block 1102, a 3D rendering generation block 1104, a column probability determination block 1106, a pose probability block 1108 and a pose selection block 1110. The pose hypothesis sampling block 310 tests a plurality of pose hypotheses, based on the integral column representation of the segmented image and a respective 3D rendering corresponding to each pose hypothesis.

The pose hypothesis generation block 1102 generates a set of pose hypotheses clustered around the initial pose. If the tracker 314 (FIG. 3A) is updated frequently, then the drift between consecutive updates will be small, and the pose hypotheses can be closely clustered around the initial pose.

The 3D rendering generation block 1104 provides a means for generating a respective 3D rendering of the scene corresponding to a respective field of view of the image capture device 102 (FIG. 1) in each respective one of a plurality of poses around the initial pose. For each pose hypothesis, the 3D rendering generation block 1104 generates a respective 3D rendering (of the 2.5D model) corresponding to the pose hypothesis.

For the same pose hypothesis, the column probability determination block 1106 determines a respective probability that each respective pixel of the region (i.e., column) belongs to each respective class in the plurality of classes for the pose hypothesis. Column probability determination block 1106 combines the respective probabilities corresponding to each class and each set of pixels within the column, for one of the plurality of poses. For example, column probability determination block 1106 can compute the respective value of a pose likelihood function corresponding to each individual integral column from the semantic segmentation of the input image.

To measure how well a rendering from pose p fits to the segmentation, the log-likelihood is determined:

$$\mathcal{L}(p) = \Sigma_x \log P_{c(p,x)}(X) \qquad (2)$$

The sum runs over all image locations x, with c(p,x) being the class at location x when rendering the model under pose p, and Pc(x) being the probability for class c at location x given by the corresponding probability map predicted by the semantic segmentation step in Eq. (1).

The pose probability block 1108 then determines a respective probability that each respective 3D rendering matches or aligns with the segmented image. The pose probability block 1108 combines the respective probabilities (i.e., the column likelihood function) over all of the plurality of regions (i.e., all of the integral columns) to provide a pose probability. For example, the pose probability block 1108 can add the column likelihood function over all of the integral columns.

Under reasonable assumptions, the sum in Eq. (2) can be computed quickly. The angles between the image capture device and the gravity vector can be estimated very accurately by the sensors. This allows use of a narrow pose search space, and also facilitates rectification of the input image—discussed above with respect to FIGS. 6A-6B—such that the columns of the image correspond to vertical lines in 3D. Since vertical lines in the 3D renderings also correspond to vertical lines in 3D, the sum over the image in Eq. (2) can be computed column by column and the respective probabilities for each of the plurality of regions are combined by summation. To facilitate the computation, equation (2) can be rewritten as:

$$\mathcal{L}(p) = \Sigma u \Sigma v \log P_{c(p,(u,v))}(u, v) \qquad (3)$$
$$= \Sigma_u \ell(u),$$

where u and v denote the indices of the column and the row of an image location, respectively.

To efficiently compute the sum '(u), the integral columns representation of FIGS. 10A-10C is used. The integral columns are defined for the probability map of class c as $$(\mathbb{P}_c)[u,v] = \Sigma_{j=0}^{v-1} \log P_c[u,j] \quad (4)$$

which can be computed efficiently similarly to integral images:

$$\begin{cases} (\mathbb{P}_c)(u, 0) = 0 \\ (\mathbb{P}_c)(u, v) = (\mathbb{P}_c)[u, v-1] + \log P_c[u, v] \end{cases} \quad (5)$$

Note that the (Pc) only depend on the segmentation, and is computed only once per segmented image, independently of the number of the pose samples evaluated.

The pose selection block 1110 provides a means for selecting a pose from the plurality of poses, such that the selected pose aligns the 3D rendering with the segmented image. The pose selection block 1110 selects the pose hypothesis that maximizes the image likelihood function as the pose that optimally aligns the 3D rendering with the segmented image from semantic segmentation block 308. The pose selection block 1110 outputs the selected pose to the pose correction block 316 (FIG. 3A). The pose correction block 316 then applies the selected pose to correct inaccuracies (e.g., drift) caused by the 3D tracker 314 (FIG. 3A).

The methods described herein do not rely on pre-registered images. This makes the method more convenient, and also more robust. The pose determination is less affected by illumination variations, occlusions (blocking objects), or other changes in the scene. For example, the method can eliminate tracker drift under different illumination conditions, such as on a day in which conditions vary from cloudy to bright sunlight casting shadows on the facades.

The 3D tracking method based on semantic segmentation can work reliably on challenging image sequences from handheld cameras and sequences from a car-mounted camera rig in urban scenarios. Semantic segmentation avoids the need of reference images and is robust against various imaging artifacts. The method represents the content of the image as information that is directly related to the available 3D data, obtained from simple 2.5D maps.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method of determining a pose of an image capture device, comprising:
   accessing an image of a scene captured by the image capture device;
   performing a semantic segmentation of the image of the scene, to generate a segmented image, the segmented image being divided into a plurality of regions, and each region of the plurality of regions having a plurality of pixels;
   generating an initial pose of the image capture device using a three-dimensional (3D) tracker;
   generating a plurality of 3D renderings of the scene, each of the plurality of 3D renderings corresponding to one of a plurality of poses chosen based on the initial pose;
   determining, for each of the plurality of poses, first probabilities that the pixels within at least one of the plurality of regions of the segmented image belong to a plurality of classes based on a sequence type of the at least one of the plurality of regions; and
   selecting a pose from the plurality of poses based on the determined first probabilities, such that the 3D rendering corresponding to the selected pose aligns with the segmented image.

2. The method of claim 1, further comprising updating the 3D tracker based on the selected pose.

3. The method of claim 1, further comprising:
   capturing the image of the scene using the image capture device; and
   rectifying the image of the scene before the semantic segmentation.

4. The method of claim 1, wherein generating the initial pose includes using calibration data, position data or motion data from one or more sensors.

5. The method of claim 4, wherein the plurality of poses includes the initial pose, and the calibration data, position data or motion data are used to determine a pose search space including the plurality of poses.

6. The method of claim 1, further comprising determining a second probability that each of the plurality of 3D renderings of the scene aligns with the segmented image, wherein the selecting is based on the determined second probability.

7. The method of claim 6, wherein determining one of the first probabilities for one of the plurality of poses includes:
   dividing the segmented image into the plurality of regions, and
   combining the first probabilities corresponding to each of the plurality of classes and each of the plurality of regions, for the one of the plurality of poses.

8. The method of claim 7, wherein the plurality of regions are columns of equal size.

9. The method of claim 1, wherein each region of the plurality of regions comprises a plurality of pixels, and the semantic segmentation is performed by a neural network configured to classify each of the plurality of pixels in each region as belonging to a facade, a vertical edge, a horizontal edge or background.

10. The method of claim 1, wherein:
    the plurality of classes include at least one of facades, vertical edges, horizontal edges or background; and
    the segmented image defines each of the plurality of regions as having a predetermined number of predetermined sequences of classes, wherein each of the predetermined sequence of classes includes at least one of the facades, vertical edges, horizontal edges or background.

11. The method of claim 10, wherein each of the plurality of regions is a column having a width one pixel wide.

12. The method of claim 1, wherein determining the first probabilities comprises determining a probability that each of the pixels belongs to each of the plurality of classes based on a location of each transition between adjacent pixels belonging to respectively different classes in the plurality of classes.

13. The method of claim 1, further comprising training a neural network to perform the semantic segmentation, by labelling a blocking foreground object in front of a facade as being a part of the facade.

14. The method of claim 1, wherein,
the determining comprises determining the first probabilities that the pixels within each of the regions of the segmented image belong to the plurality of classes based on the sequence type of each of the regions.

15. A system for determining a pose of an image capture device, comprising:
a processor coupled to access an image of a scene captured by the image capture device; and
a non-transitory, machine-readable storage medium coupled to the processor and encoded with computer program code for execution by the processor, the computer program code comprising:
code for performing a semantic segmentation of the image of the scene to generate a segmented image, the segmented image being divided into a plurality of regions, and each region of the plurality of regions having a plurality of pixels;
code for causing a three-dimensional (3D) tracker to generate an initial pose of the image capture device;
code for generating a plurality of 3D renderings of the scene, each of the plurality of 3D renderings corresponding to one of a plurality of poses chosen based on the initial pose;
code for determining, for each of the plurality of poses, first probabilities that the pixels within at least one of the plurality of regions of the segmented image belong to a plurality of classes based on a sequence type of the at least one of the plurality of regions; and
code for selecting a pose from the plurality of poses based on the determined first probabilities, such that the 3D rendering corresponding to the selected pose aligns with the segmented image.

16. The system of claim 15, wherein the machine-readable storage medium further comprises code for updating the 3D tracker based on the selected pose.

17. The system of claim 15, wherein the program code further comprises code for rectifying the image of the scene before the semantic segmentation.

18. The system of claim 15, wherein the program code further comprises code for determining a second probability that each of the plurality of 3D renderings of the scene aligns with the segmented image, wherein the selecting is based on the determined second probability.

19. The system of claim 18, wherein the code for determining the first probabilities includes:
code for dividing the segmented image into the plurality of regions, and
code for combining the determined first probabilities corresponding to each of the plurality of classes and each of the plurality of regions for one of the plurality of poses.

20. The system for determining a pose according to claim 19, wherein the code for determining the first probabilities includes code to configure the processor for determining respective first probabilities for each region of the plurality of regions based on a location of each transition between adjacent pixels belonging to respectively different classes in the plurality of classes.

21. The system of claim 15, wherein the plurality of regions are columns of equal size, one pixel wide.

22. The system of claim 15, wherein the code for performing the semantic segmentation is configured to cause a neural network to classify each region as at least one of a facade, a vertical edge, a horizontal edge or a background.

23. The system of claim 15, wherein:
the plurality of classes include at least one of facades, vertical edges, horizontal edges or background; and
the code for performing a semantic segmentation is adapted to define each of the plurality of regions as having a predetermined number of predetermined sequences of classes, wherein each of the predetermined sequence of classes includes at least one of the facades, vertical edges, horizontal edges or background.

24. The system of claim 15, wherein
the machine-readable storage medium further comprises code for determining the first probabilities that the pixels within each of the regions belong to the plurality of classes based on the sequence type of each of the regions.

25. A system for determining a pose of an image capture device, comprising:
means for performing a semantic segmentation of an image of a scene captured by the image capture device to generate a segmented image, the segmented image being divided into a plurality of regions, and each region of the plurality of regions having a plurality of pixels;
means for generating an initial pose of the image capture device;
means for generating a plurality of 3D renderings of the scene, each of the plurality of 3D renderings corresponding to one of a plurality of poses chosen based on the initial pose;
means for determining, for each of the plurality of poses, first probabilities that the pixels within at least one of the plurality of regions of the segmented image belong to a plurality of classes based on a sequence class of the at least one of the plurality of regions; and
means for selecting a pose from the plurality of poses based on the determined first probabilities, such that the selected pose aligns the 3D rendering with the segmented image.

26. The system of claim 25, further comprising means for updating the means for generating an initial pose based on the selected pose.

27. The system of claim 25, further comprising means for determining a respective second probability that each respective 3D rendering matches the segmented image, wherein the selecting is based on the determined second probabilities.

28. The system of claim 25, wherein
the system further comprises means for determining the first probabilities that the pixels within each of the regions of the segmented image belong to the plurality of classes based on the sequence type of each of the regions.

29. A non-transitory, machine-readable storage medium and encoded with computer program code for configuring a processor to determine a pose of an image capture device, the computer program code comprising:

code for performing a semantic segmentation of an image of a scene to generate a segmented image, the segmented image being divided into a plurality of regions, and each region of the plurality of regions having a plurality of pixels;

code for causing a three-dimensional (3D) tracker to generate an initial pose of the image capture device;

code for generating a plurality of 3D renderings of the scene, each of the plurality of 3D renderings corresponding to one of a plurality of poses chosen based on the initial pose;

code for determining, for each of the plurality of poses, first probabilities that the pixels within at least one of the plurality of regions of the segmented image belong to a plurality of classes based on a sequence type of the at least one of the plurality of regions; and code for selecting a pose from the plurality of poses based on the determined first probabilities, such that the selected pose aligns the 3D rendering with the segmented image.

30. The machine-readable storage medium according to claim 29, wherein the machine-readable storage medium further comprises code for updating the 3D tracker based on the selected pose.

31. The machine-readable storage medium according to claim 29, wherein the program code further comprises code for rectifying the image of the scene before the semantic segmentation.

32. The machine-readable storage medium according to claim 29, wherein the program code further comprises code for determining a respective second probability that each respective 3D rendering matches the segmented image, wherein the selecting is based on the determined second probabilities.

33. The machine-readable storage medium according to claim 29, wherein the code for determining the first probabilities includes:

code for dividing the segmented image into the plurality of regions, and code for combining the respective first probabilities for each of the plurality of regions.

34. The non-transitory, machine-readable storage medium according to claim 29, wherein the machine-readable storage medium further comprises code for determining the first probabilities that the pixels within each of the regions belong to the plurality of classes based on the sequence type of each of the regions.

* * * * *